United States Patent [19]

Grosseau

[11] 3,887,870

[45] June 3, 1975

[54] PULSE REPETITION RATE METERS

[75] Inventor: Albert Grosseau, Chaville, France

[73] Assignee: Societe Anonyme Automobiles Citroen, Paris, France

[22] Filed: Sept. 28, 1972

[21] Appl. No.: 293,023

[30] Foreign Application Priority Data

Sept. 30, 1971 France .............................. 71.35897

[52] U.S. Cl................. 324/78 D; 324/168; 324/186
[51] Int. Cl. .......................................... G01h 23/02
[58] Field of Search ....... 324/78 D, 79 D, 186, 166, 324/168, 169; 328/140; 128/205 T, 206 F

[56] References Cited
UNITED STATES PATENTS 3,769,583  10/1973  Spencer et al. .................... 324/78 D

FOREIGN PATENTS OR APPLICATIONS 1,912,856  10/1970  Germany .......................... 324/78 D

OTHER PUBLICATIONS

Shulman Trans. AIEE. Nov. 1954, pp. 452-455.
Goodwin, Electronics, Apr. 10, 1959, pp. 58-61.

Primary Examiner—Alfred E. Smith
Assistant Examiner—Michael J. Tokar
Attorney, Agent, or Firm—Eyre, Mann & Lucas

[57]  ABSTRACT

A pulse repetition rate meter has a time base for generating a fixed plurality of auxiliary pulses in response to each pulse received of a train of pulses whose repetition rate is to be measured. A clock periodically provides a gating signal having a predetermined duration greater than the period between two successively occuring pulses in the train of pulses to be measured. A gated counter under the control of the gating signal counts all the auxiliary pulses from the time base that occur during the period of the gating signal. The count thus registered is a function of the pulse repetition rate.

7 Claims, 4 Drawing Figures

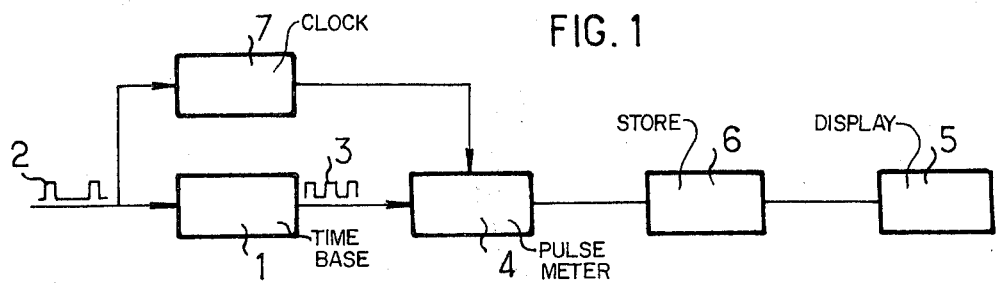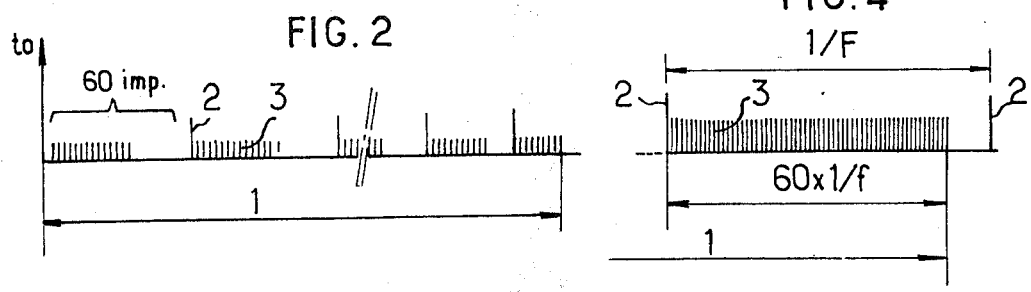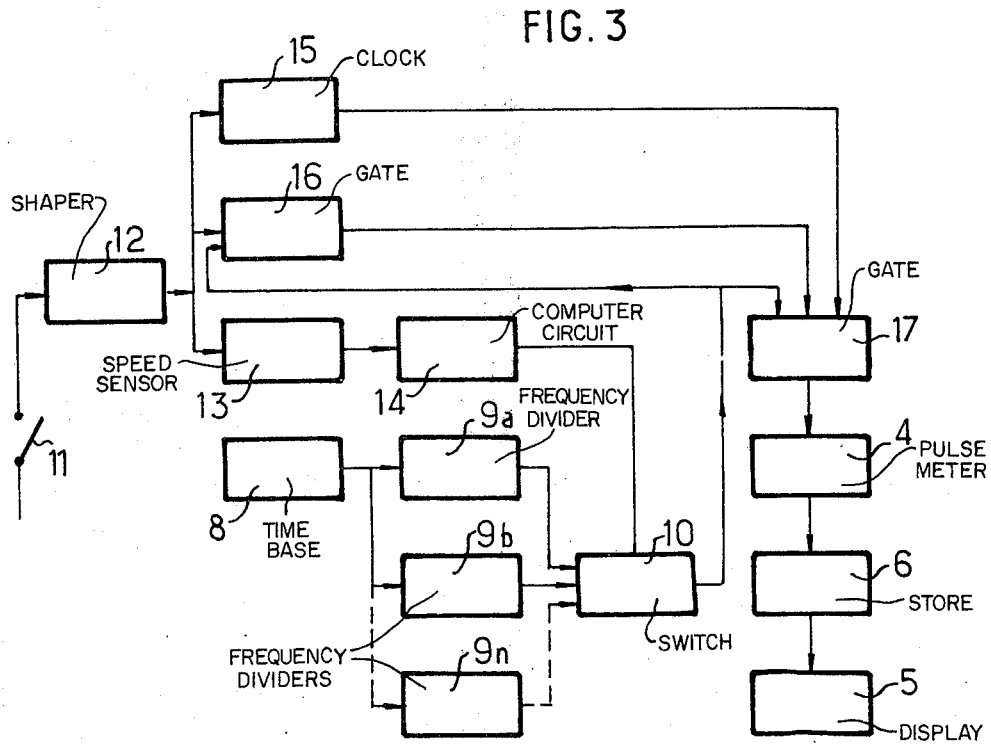

PULSE REPETITION RATE METERS

BACKGROUND OF INVENTION

1. Field of invention

The present invention relates to pulse repetition rate meters, such as for use as tachometers to determine engine speed for example.

2. Description of prior art

Previously proposed pulse repetition rate meters do not permit accurate and fast determination of the frequency of pulses when the frequency is relatively low. If, for example, a count is taken over a period of 1 second of pulses having a frequency of the order of 50 Hz, the maximum degree of accuracy is usually about 2%; if the count is taken over a period of 1 minute the count rate becomes more accurate, but then the meter will only supply a mean value and not indicate any instantaneous variations which may have taken place.

It has also been proposed to determine the frequency of a series of pulses by measuring the time elapsing between two immediately successive pulses. These devices give a fast and accurate time measurement for low frequencies only but do not measure the frequency directly.

It is an object of the invention to provide a device which can determine with accuracy and at high speed the repetition rate of a pulse train.

SUMMARY OF THE INVENTION

This device is characterised in that it comprises time base means for supplying a group of $p$ auxiliary pulses during a time shorter than the time interval separating two pulses, the repetition rate of which is to be measured, means for synchronising the beginning of each group of auxiliary pulses with a pulse to be measured, and means for metering the number of auxiliary pulses emitted by the time base during a given period, for example during 1 second.

The number of auxiliary pulses counted is representative of the frequency of the pulses to be measured. The accuracy of the device is greater if the group of $p$ auxiliary pulses is supplied for a period close to the time interval separating two pulses the repetition rate of which is to be measured. Thus, it is advantageous that the device should comprise several sources able to supply groups of $p$ auxiliary pulses at different frequencies, means for determining approximately the value of the frequency or repetition rate to be measured, and a switching circuit which is controlled by the said means and which is able to connect to the meter the source supplying the auxiliary pulses at the suitable frequency.

The pulse sources could be constituted by several time bases, but it is simpler to provide a single time base connected to a series of frequency dividers.

To obtain the group of pulses, the device may comprise an auxiliary meter synchronised with the pulses the frequency of which is to be determined, which counts the auxiliary pulses and stops the main meter when the desired number $p$ of auxiliary pulses has been transmitted, until the arrival of the next pulse of the pulse train the frequency of which pulses is to be measured.

The device may also include a clock synchronised with the pulses the frequency of which is to be determined and able to stop the meter at the end of a given time, for example one second.

BRIEF DESCRIPTION OF THE DRAWINGS

Pulse repetition rate meters for measuring the speed of a spark ignition engine and embodying the invention will now be described, by way of example, with reference to the accompanying drawing in which:

FIG. 1 is a block diagram of one of the pulse repetition rate meters;

FIG. 2 is a diagram to aid understanding of the operation of the device in FIG. 1;

FIG. 3 is a block diagram of another of the pulse repetition rate meters; and

FIG. 4 is a diagram showing the maximum error which may occur in the meter of FIG. 1.

DESCRIPTION OF THE PREFERRED EMBODIMENTS

As shown in FIG. 1, a tachometer comprises a time base 1 triggered by ignition pulses 2 of a spark ignition engine (not shown) and to supply a set of $p$ pulses 3 over a period of time shorter than the time separating two pulses 2. The time base 1 preferably comprises a generator which is triggered by each of the pulses 2, the frequency of which is to be measured, to generate pulses 3 at a predetermined frequency, and also comprises a counter operative to count the pulses produced by the generator, the counter being operative to halt the generator when the number of pulses 3 reaches the predetermined plurality $p$. The tachometer also includes a pulse meter 4 connected to the time base, a display device 5 connected to the pulse meter 4 through a store 6, and a clock 7 operable to enable the meter 4 for a given time, for example one second, in response to a pulse 2 so that metering commences at the instant when an ignition pulse occurs.

It will be assumed for the sake of example that the engine is a twin-cylinder, four stroke engine and the number of revolutions per minute made by the engine is therefore equal to 60 F where F is the frequency of the ignition pulses 2; in that case, it is of advantage that $p$ be equal to 60. It will be further assumed that an approximate maximum speed of the engine is known, this being, for example, less than 3,000 rpm. Under these conditions, the time interval between two pulses 2 must be at least 0.020 sec. Thus the time base advantageously supplies pulses at a repetition rate of 3,000 Hz.

If the shaft rotates, for example at a speed of 2,850 rpm, it performs 47.5 revolutions per second, each revolution lasting 0.0210 sec. The time base will be triggered forty-eight times in one second starting from time $t_o$ (see FIG. 2). On each of the first 47 occasions on which it was triggered it will supply 60 pulses, but on the 48th occasion the meter 4 will be stopped by the clock 7 at the end of a time $t$ equal to 0.0105 sec. (half the time interval between two pulses 2), and only 31 pulses from the time base 1 will be counted during this last occasion on which it is triggered.

The number of pulses counted by the meter 4 and displayed by the display device 5 will be a total of 2,851. This number represents the number of revolutions per minute of the engine with an absolute error equal to 1 and a relative error equal to 0.03%.

In the case of a three or four cylinder engine $p$ advantageously has a value of 40 or of 30 respectively, and then the number of revolutions per minute of the engine would again be indicated with a good accuracy by the number of pulses 3 displayed by the display device 5.

From the foregoing description it will be seen that:

a. the error is nil if the *p* impulses 3 are emitted exactly during the time interval separating two impulses 2, which corresponds, in the example given, to a speed of 3,000 rpm;

b. the error is again nil if a whole number of pulses 2 occur during the period of 1 second, which is the case, for example, for a speed of rotation of 2,400 rpm;

c. if the *p* pulses were emitted over a period greater than the time interval separating two pulses 2, only part of these pulses would be counted and the error thus committed would add itself to that taking place during the last occasion in the period of one second that the time base was triggered; the accuracy would fall. Thus, if the frequency of the time base were, for example, 2,700 Hz so that the group of the 60 pulses would have a duration of 0.022 sec., the meter 4 would, where the engine speed is 2,850 rpm, count only 56 pulses during each of the first 47 occasions of triggering and 28 during the 48th. The total number of pulses displayed in the display device 5 would be 2,660. The absolute error would be 190 and the relative error 6.6%;

d. if the time interval separating two pulses 2 is high in relation to the duration of the sixty pulses 3, it may happen that, at the occasion of the last triggering of the time base, the sixty pulses all have time to be counted a long time before the clock 7 stops the meter. The error committed can be considerable as, in such a case, only some of these pulses should have been taken into consideration. If, for example, the engine rotates only at 270 rpm, while the time base still supplies pulses at 3,000 Hz, this time base will be released 5 times and the meter will show 300 pulses; the absolute error will be 30 and the relative error will be 11%. The meter will show moreover this same value of 300 for any number of revolutions in the range of 244 to 300 rpm.

This latter defect can be remedied by controlling the frequency of the time base in such a way that the 60 pulses 3 have no time to pass before the last triggering.

Thus, if *f* denotes the frequency of the time base and F the frequency of the ignition pulses 2, only 60 1/*f* × 60 F should pass during the time 60 1/*f* while only 60 F pass in the most unfavourable case.

The maximum absolute error is therefore:

$$E = 60 (1 - 60/f F)$$

i.e., as in the case under consideration the engine is of the twin-cylinder, four-stroke type:

$$E = 60 ( 1 - N/f )$$

*f* may therefore be selected so that the maximum absolute error E (or the relative error E/N) lies below a predetermined value.

If the frequency *f* is 6,000 Hz, there will be a maximum error of 20 for N = 4,020 rpm. This frequency makes it therefore possible to obtain the value of N with a relative error of 0.5%, for any number of revolutions in the range of 4,000 to 6,000 rpm.

To ensure the frequency of the time base, there may be provided a device metering at a speed close to that of the engine and a switching device controlled by the metering device as will now be described.

In the modification shown in FIG. 3 a time base 8 supplying high frequency pulses, for example of 1 MHz, is connected to a series of frequency dividers 9*a*, 9*b* . . . 9*n*. These dividers are themselves connected to a switching device 10, which is of known configuration.

The ignition pulses 2 coming from a circuit breaker 11 are shaped in a circuit 12. This circuit 12 is connected with a speed sensor 13 able to supply a spiked pulse, for example every four revolutions of the engine, and which is itself connected to a computer circuit 14 that supplies a signal representing the time taken by the engine to perform these four revolutions. These circuits 13 and 14 are of known configuration and the signal they supply is approximately representative of the number of revolutions per minute of the engine. The computer 14 is, moreover, connected to the switch 10 in such a way as to select from among all the signals coming from the dividers 9*a*, 9*b* . . . 9*n* one that has the most suitable frequency. A suitable frequency is one whose value expressed in Hz is, for a twin-cylinder four-stroke engine, the nearest to the number of revolutions per minute of the engine as determined by the computer 14 but greater than that number of revolutions per minute of the engine.

The shaping circuit 12 is also connected to a clock 15 (corresponding to clock 7 of FIG. 1) which is thus triggered at the time of the arrival of a pulse 2 to supply a signal having a duration of one second in synchronism with the ignition. The shaping circuit 12 is also connected to a device 16 which is, moreover, connected to the output of the switching circuit 10. The device 16 is triggered by each pulse 2 and is operative to count the number of pulses 3 emitted by the circuit 10 to supply a gating signal. The duration of each gating signal corresponds to a given number of the pulses 3 and is a function of the number of cylinders of the engine. The gating signals are fed to a logic or gate circuit 17 together with the pulses 3 from the switch 10, and the circuit 17 responds only to the pulses 10 occurring during each gating signal. The clock 15 is also connected to the logic circuit 17 the output of which is connected with the meter 4. The circuit 17 supplies to the meter 4 a given number of pulses 3, in response to each pulse 2, and halts the operation of the meter at the end of 1 second. The total number of pulses supplied to meter 4 during the 1 second period is stored in the storage device 6 and displayed by the display device 5, while the meter is reset to zero and then counts a new series of pulses.

The devices described enable a speedy determination of the speed of rotation of an engine, to a degree of accuracy which may be as high as desired. The device is particularly useful when the engine is being adjusted or timed.

It will be appreciated the present invention is not limited to the methods of execution described and represented, but includes all modifications falling within the scope of the appended claims.

I claim:

1. A pulse-repetition rate meter, comprising
time base means having an input to receive pulses whose repetition rate is to be measured and an output, the time base means being operative upon receipt of each pulse at its input to generate a predetermined plurality of auxiliary pulses at a frequency such that the said plurality is completed before the next following pulse to be measured occurs, counting means having an input connected to the output of the time base means and a gate input, and control means for supplying a control signal to the gate input of the counting means to render the counting means operative to count said auxiliary pulses for a predetermined duration only, whereby the count registered by the counting means is representative of the repetition rate of the pulses applied to the input of the time base means.

2. A meter according to claim 1 wherein the time base means comprises a generator triggered by each pulse to be measured to generate pulses at a predetermined frequency, and a counter for counting the generated pulses, the counter being operative to halt the generator when the count reaches said predetermined plurality.

3. A meter according to claim 1 wherein said control means comprises clock means having an input connected to receive the pulses applied to the input of the time base means, and having an output connected to the gate input of the counting means, the clock means being triggered by each pulse received to activate the counting means and operative to de-activate the counting means at the end of the said predetermined duration.

4. A meter according to claim 1, wherein the pulses whose repetition rate is to be measured are representative of the speed of the rotation of the shaft.

5. In combination, a four stroke spark ignition engine having means for generating ignition pulses, and a pulse repetition rate meter according to claim 1, the said means for generating ignition pulses being connected to feed the ignition pulses to the input of the time base means, said plurality of auxiliary pulses being 240/n in number, where n is a number of cylinders of the engine.

6. In combination, a two stroke spark ignition engine having means for generating ignition pulses, and a pulse repetition rate meter according to claim 1, the said means for generating ignition pulses being connected to feed the ignition pulses to the input of the time base means said plurality of auxiliary pulses being 120/n in number, where n is a number of cylinders of the engine.

7. A pulse-repetition rate meter, comprising:

a. time base means having an input and output, said input being operative to receive pulses whose repetition rate is to be measured, said time base means being operative upon receipt of each of said pulses to be measured to generate during a portion of the time period elapsing between consecutive pulses to be measured a predetermined plurality of auxiliary pulses at a predetermined frequency, the generation of said auxiliary pulses being completed before the next following pulse to be measured occurs, the frequency of said auxiliary pulses determining said portion of said time period during which said auxiliary pulses are generated;

b. counting means having an input connected to the output of the time base means and a gate input; and c. control means operative to supply a control signal to the gate input of said counting means to render said counting means operative to count said auxiliary pulses for a predetermined duration only, whereby the count registered by said counting means is representative of the repetition rate of the pulses applied to the input of the time base means whose repetition rate is to be measured.

* * * * *